United States Patent [19]
Gambini et al.

[11] Patent Number: 5,581,388
[45] Date of Patent: Dec. 3, 1996

[54] METHOD OF AND DEVICE FOR THE FINE SYNCHRONIZATION OF AIM CELLS IN OPTICAL ATM NODES

[75] Inventors: Piero Gambini; Emilio Vezzoni, both of Turin, Italy

[73] Assignee: CSELT - Centro Studi E Laboratori Telecomunicazioni S.P.A., Turin, Italy

[21] Appl. No.: 331,202

[22] Filed: Oct. 28, 1994

[30]      Foreign Application Priority Data

Dec. 16, 1993  [IT]  Italy .................... TO93A0956

[51] Int. Cl.⁶ ............................................ H04J 14/08
[52] U.S. Cl. ...................... 359/140; 359/158; 370/395
[58] Field of Search .......................... 359/140, 158, 359/123, 137, 135; 370/50, 94.1, 94.2, 60, 60.1

[56]            References Cited

U.S. PATENT DOCUMENTS 5,325,222   6/1994   Jacob et al. .......................... 359/140
5,438,444   8/1995   Tayonaka et al. ................... 359/140

OTHER PUBLICATIONS

Optical Time Division Multiplexing For Very High Bit–Rate Transmission, Tucker et-al, IEEE (journal of lightwave technology), pp. 1737–1749, Nov. 6, 1983.

A B–Ison Local Distribution System based on a Passive Optical Network, J. W. Ballance et al 1990 IEEE Switching In Future Ultra–High Capacity All–Optical Networks, Barnsley et al IEICE 1992.

OFC/IOOC'93 Optical Society of America, San Jose 21–26 Feb. 1993

Globecom '90 IEEE Global Telecommunications Conference And Exhibition, Ballance et al.

OFC/100C, 26 Feb. 1993, San Jose, Cal., J. L. Dexter et al, pp. 172–173.

International Switching Symposium 1992, Switching in Future Ultra–High Capacity, Barnsley et al.

*Primary Examiner*—Wellington Chin
*Assistant Examiner*—Rafael Bacares
*Attorney, Agent, or Firm*—Herbert Dubno

[57]                ABSTRACT

Within an optical ATM node, an ATM cell to be synchronized is sent into a segment of pre-determined length of an optical fiber with a high time dispersion (FD), after having been associated, in a tunable wavelength converter (CL), to an optical carrier with a wavelength that is different from that with which the cell itself was received and such that, as an effect of the transit the fiber (FD), the cell reaches the input side of a switching element (Em1 . . . Emh) of the node (NC) at a predetermined instant.

10 Claims, 3 Drawing Sheets

METHOD OF AND DEVICE FOR THE FINE SYNCHRONIZATION OF AIM CELLS IN OPTICAL ATM NODES

FIELD OF THE INVENTION

The invention described herein relates to switching nodes of fast cell switching networks (or ATM—Asynchronous Transfer Mode—networks) in optical technology and, more particularly, to a method of, and more specifically it concerns a method and a device for the fine synchronization of the cells in one such node.

BACKGROUND OF THE INVENTION

The ATM technique is of increasing importance for the transport and switching of digital informational flows at very high speed, such as those present in wide band integrated service digital networks. In this technique, the information associated with the various services is organized into contiguous packets of fixed length (about 400 bits), called "cells", formed by an information field and a header field (tag) that carries service information, including the information necessary for the routing through the network.

In an ATM network, the switching nodes must carry out both routing the cells (thus performing a spatial switching function), and avoidance of possible conflict situations, which occur when several cells entering the node simultaneously from different inputs have to be routed toward the same output (thus, the mode performs a memorization function). In order to satisfy the requirements for bit rate and bandwidth of modem integrated services networks, ATM switching nodes based on optical techniques have been proposed. There, both routing and memorization are performed by means of optical devices. In this way, it has been possible to operate at very high bit rates, of the order of several Gbit/s.

An example of a node of this type is described, for instance, in commonly owned European patent application EP-A-0 411 562.

In a communication system based on the ATM technique, the cells containing information may be emitted by the various transmitting stations at random times. In the optical systems proposed so far, there is the need for a synchronization of the cells arriving at the various inputs of a node, so as to facilitate its operation. In a large optical switching node, comprising a multi-stage network, there may be a further synchronization need, due to the uncertainty about the length of the optical paths that the cells travel through in the node. In the first case, the cell synchronization system must be able to recover time shifts of ± half a cell, whereas in the second case the time shift to be recovered may be of much smaller proportions, in the order of a few nanoseconds.

The synchronization of the ATM cells arriving at the different inputs of a single-stage optical switching node is described in European patent application EP-A 0 411 562 mentioned above. The time realignment is performed by acting on signals converted into electrical form, within the devices performing the tag processing necessary for routing. The possibility to operate directly on optical signals is also suggested.

OBJECT OF THE INVENTION

The object purpose of the invention is to provide a method of and a device for the fine synchronization of ATM cells, which can compensate delays due to possible differences in optical paths within the node, by exploiting the dependence of dispersion in an optical fiber on wavelength.

SUMMARY OF THE INVENTION

According to the invention, a method is provided in which the cell to be realigned is sent into a segment of predetermined length of optical fiber with high time dispersion, after having been associated to a re-phasing optical carrier of such a wavelength that, as a result of the transit through the fiber, the cell reaches the input of a subsequent switching element of the node at a predetermined instant, and in which the beginning of the cell to be realigned is recognized, the time delay between the beginning of the cell and a reference instant is evaluated, and an error signal representative of the entity of this delay is generated, the error signal causing the transfer of the cell from an original carrier, to which the cell to be realigned is associated, to the re-phasing carrier.

A system arranged to impose a continuously variable delay on an electrical signal by exploiting the dependence of the dispersion in an optical fiber on wavelength is described in the paper "Continuously variable true-time-delay modulator" presented by J. L. Dexter et al. at the OFC/IOOC '93 conference, San José (Calif., USA), 21–26 February 1993, paper ThC6. A signal, representative of the desired variable delay, modulates the wavelength of a tunable optical source, and the optical carrier generated by the source is then amplitude modulated by the electrical signal in an electrooptical modulator and sent into a segment of optical fiber. Given the wavelength variation, the signal exits the fiber with a variable delay. The delayed signal is then convened again into electrical form. The system is not aimed at compensating a delay with respect to a reference, and thus it is not applicable for the synchronization of ATM cells.

According to the invention, a device is also provided for carrying out the method, in which the cell to be realigned is sent into a segment of predetermined length of an optical fiber with high chromatic dispersion, after having been associated to a re-phasing optical carrier having such a wavelength that, as a result of the transit along the fiber, the cell reaches the input of a switching element of the node at a predetermined instant. The device comprises: means for extracting a fraction of the optical signal associated with the cell to be realigned; means for recognizing the beginning of the cell, by utilizing the said fraction of optical signal, and for generating a signal representing the occurred recognition; means for receiving the signal representing the occurred recognition of the beginning of the cell, for comparing it with a signal representing a reference instant, and for generating an error signal indicative of the entity of the delay between the two signals; and a tunable wavelength converter, driven by the error signal with transfer the cell to be realigned from an original carrier, to which the cell arriving to the device is associated, to the re-phasing carrier.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
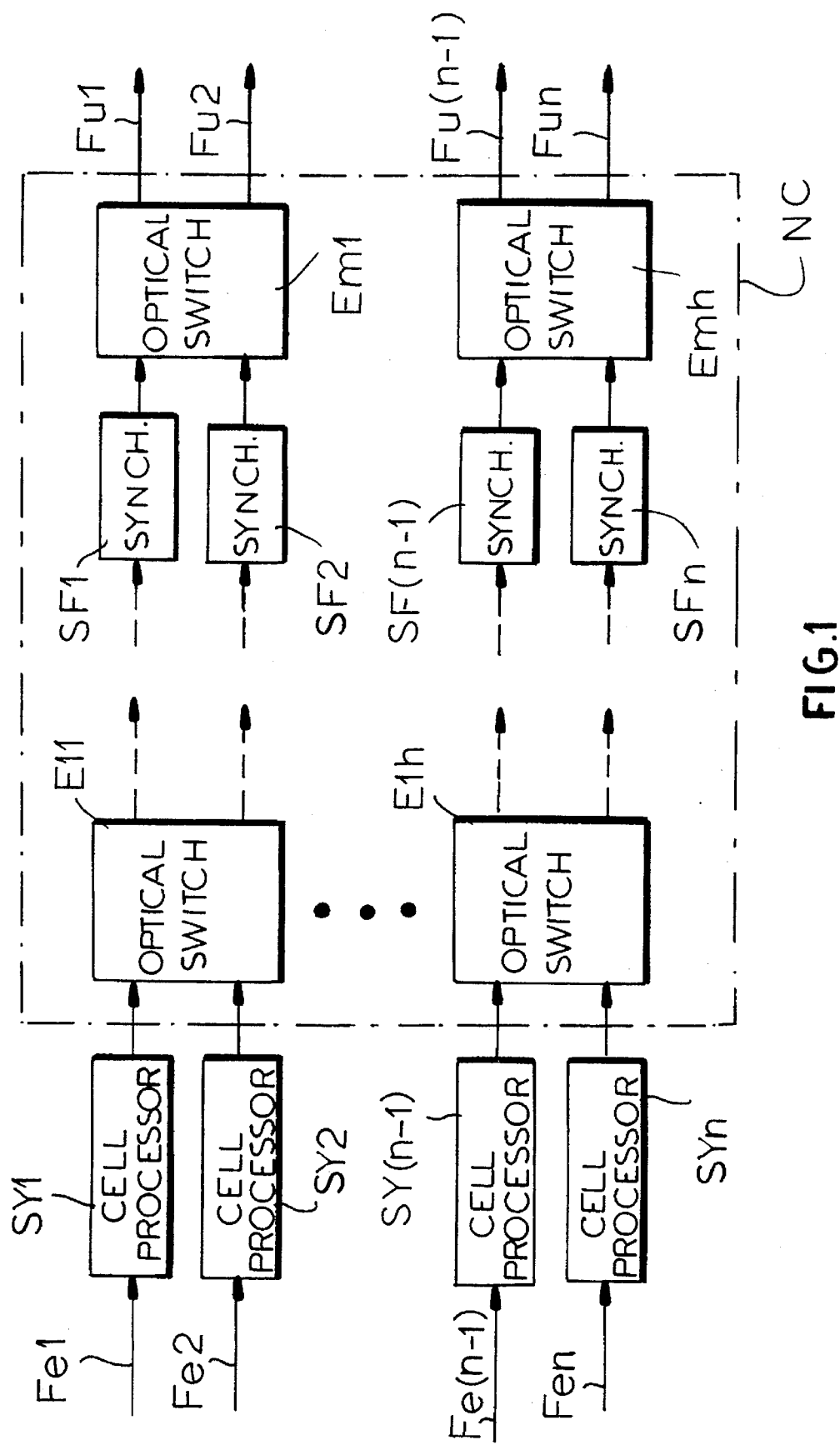
FIG. 1 is a block diagram of a switching node utilizing the invention.

In FIG. 1, NC is the connection network of an optical ATM switching node with n inputs and n outputs connected to respective optical fibers Fe1 ... Fen, Fu1 ... Fun. The node comprises, in the most general case, m stages composed of elements El1 ... Elh ... Em1 ... Emh that, purely as an example, are represented as elements with two inputs and two outputs. The structure of the node and of the switching elements has no interest for the purposes of the present invention. In general, at any rate, current ATM optical nodes present an optical connection network and an electrical control structure; this latter is not indicated in the figure because it is not influenced by the invention. Input fibers Fe1 ... Fen are associated to devices SY1 ... SYn which perform, for all ATM flows present over their respective fiber, any necessary processing of the call identification and the phase realignment of the cells needed to compensate the random emission times on the part of the respective sources and possible random fluctuations of the propagation times. Devices SY can be, for instance, of the type described in the aforementioned European patent application. Fine synchronization devices SF1 ... SFn are associated to the inputs of the switching elements of the stages of node NC subsequent to the first, so as to compensate for any possible differences in the cell optical paths between one stage and the next, which differences may give rise to differences in propagation time in the order of a few nanosecond.

Devices SF, which constitute the subject matter of the invention, exploit the dependence of dispersion in an optical fiber on wavelength. More particularly, devices SF evaluate the delay of the beginning of the cell to be realigned with respect to a time reference and send the cell to a segment of high dispersion fiber after having associated the cell with an optical carrier that is different from the one with which the cell has been received and is chosen in such a way that, given the length of the fiber segment, the cell appears at the output of the latter at the desired instant. Devices such as SF may also be associated to devices SY to refine, if need be, the phase realignment performed by them.

Figure 2:
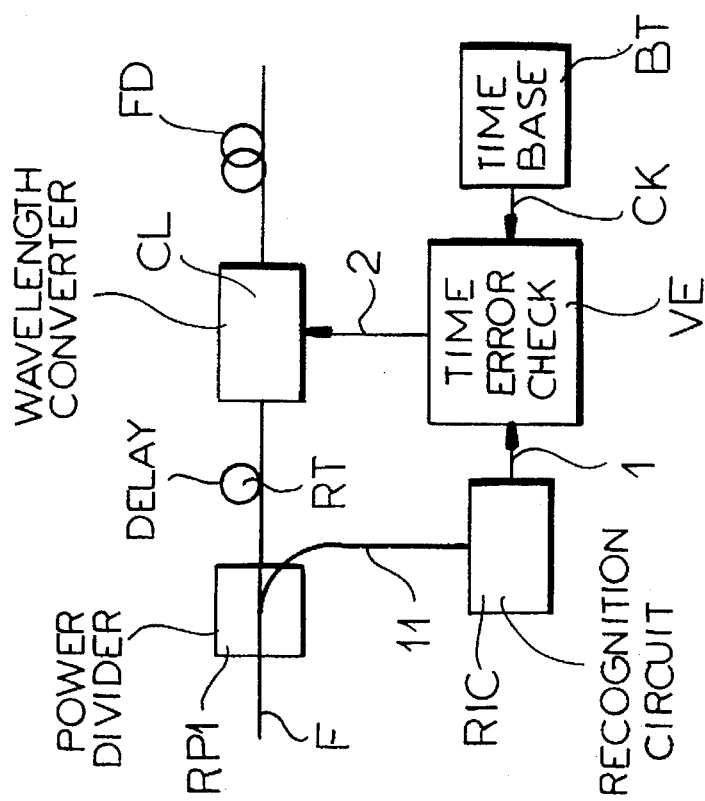
FIG. 2 is a block diagram of the device according to the invention.

The block diagram of a device SF is represented in more detail in FIG. 2, where the thick lines indicate the path of optical signals and the thin lines indicate the path of electrical signals. A power divider RP1 extracts a fraction of the power of the optical signal at wavelength $\lambda 1$ associated to a cell present on fiber F and sends that fraction to a recognizer of the beginning of the cell, RIC, through a fiber segment fl. Recognizer RIC provides a signal indicative of the occurred recognition to a device VE for evaluating the time error. Time error evaluation block VE operates a comparison between the instant of recognition of the beginning of the cell and a time reference instant (communicated by the time base BT of the node) and generates an electrical error signal representative of the entity of the delay between the beginning of the cell and the reference. The remaining part of the optical power is sent by RP1, through an optical delay element RT which has the task of compensating the processing times in RIC and VE, to a tunable wavelength converter CL whose output connected to a segment of high dispersion optical fiber FD, connected to the input of the switching element interested in node NC. Converter CL also receives the error signal generated by VE and, on the basis of that signal, brings wavelength $\lambda 1$ of the cell to a value $\lambda 2$ such that, taking into account the dispersion characteristics and the length of fiber segment FD, the cell arrives at the input of the subsequent switching element at a predetermined instant.

Devices carrying out the functions of converter CL are well known in the art. An example is described in the paper "High performance optical wavelength shifter", by B. Glance et al., Electronics Letter, Vol. 28, No. 18, pages 1714–1715.

The use of a segment of high dispersion fiber allows keeping the length of the segment limited, and therefore achieving time realignment without introducing large delays.

Figure 3:
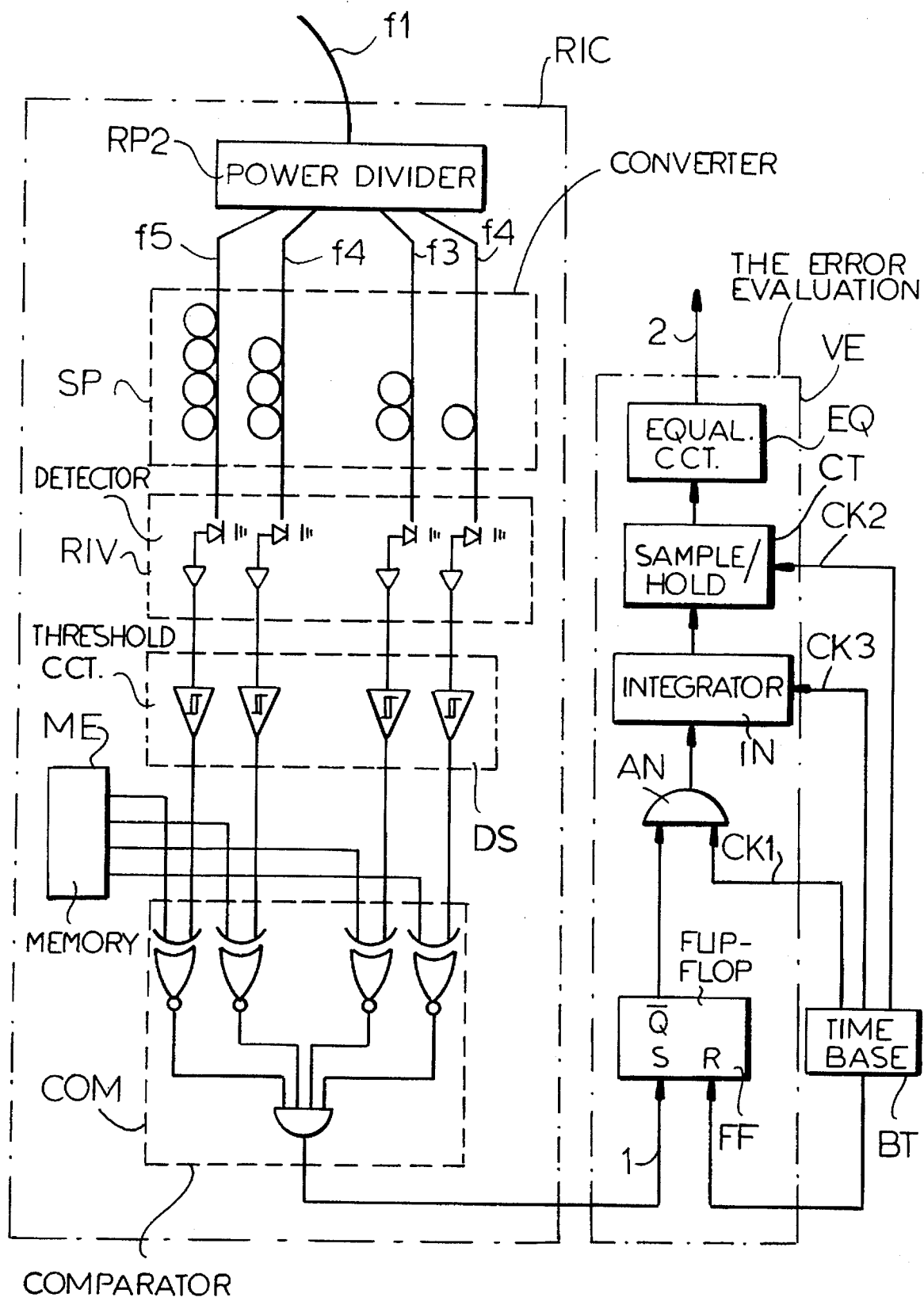
FIG. 3 is a circuit diagram of some of the blocks in FIG. 2.

FIG. 3 illustrates a possible embodiment of recognizer block RIC and time error evaluating block VE. The structure described for block RIC is based on the hypothesis that the cell header includes an initial word (of 4 bits in the example shown) of predetermined configuration. Block RIC includes a second power divider RP2 which shares the power present on $f_1$ among four different outputs connected to respective optical fiber segments $f_2 \ldots f_5$ (or in general, among as many paths as are the bits in the initial word of the cell). The four fiber segments have such a length that the signals exit $f_3$, $f_4$, $f_5$ with a delay that exceeds respectively by 1, 2, or 3 bit times the delay introduced by $f_2$. The fiber segments $f_2 \ldots f_5$ thus constitute an optical series-to-parallel converter SP. The four bits in the initial word are detected in parallel in as many detectors represented within the block RIV and, after being converted into logic signals by threshold decision circuits DS, are provided to a comparator COM that compares the configuration present at the output of RIV with a configuration established for the initial word, read in a memory ME. In case of positive outcome of the comparison, comparator COM emits on wire 1 a signal of the appropriate logic level (e.g., at level 1).

In the error evaluation circuit VE a set-reset flip-flop FF has the set input connected with wire 1 and output $\overline{Q}$ connected to an input of an AND gate AN whose other input receives a time reference signal CK1 provided by BT. The signal exiting AN, which is a pulse of a duration proportional to the delay of the pulse over wire 1 with respect to reference CK1, is provided to an integrator IN, which generates a voltage signal whose amplitude is proportional to the duration of the impulse coming from AN. The integrated signal is provided to a sample-and-hold circuit CT, controlled by a sampling pulse CK2 emitted by BT at an instant that is certainly subsequent to the end of the pulse emitted by AN (e.g. after a maximum delay allowed for the cell has elapsed). Integrator IN is reset by a signal CK3 emitted by BT in an instant subsequent to CK2. Circuit CT generates a signal of stable level that is provided to an equalization circuit EQ that has the task of compensating the non-linear characteristics of the source in wavelength converter CL (FIG. 2). Therefore the error signal controlling the wavelength conversion in CL is present on output 2 of EQ.

Figure 4:
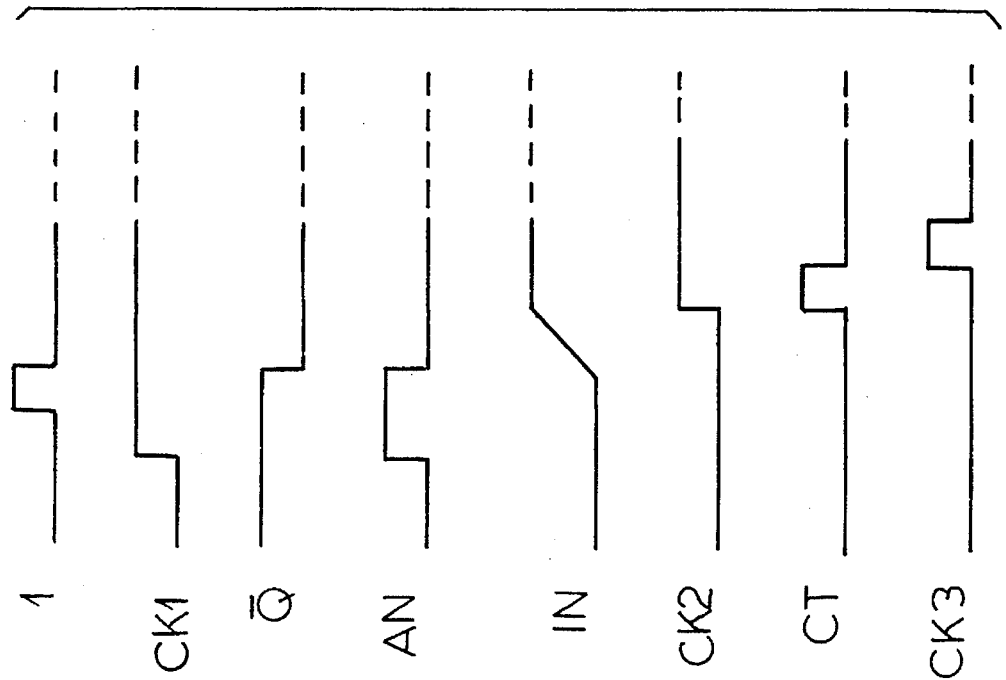
FIG. 4 is a timing diagram of some of the signals utilized to evaluate the error.

The various signals intervening in circuit VE are represented also in FIG. 4, where lines 1, $\overline{Q}$, AN, IN, CT indicate respectively the signals present on wire 1, on the output of FF and on the output of circuits AN, IN, CT.

It is evident that what is described above is provided solely as a non-limiting example and that variants and modifications are possible without departing from the scope of the invention. For example, in the recognizer of the cell beginning it would be possible to perform the detection directly on the serial signal present on $f_1$ and to carry out the series-to-parallel conversion on the eletrical signals; however, the series-to-parallel conversion performed optically allows elimination of the bandwidth and attenuation problems which would be encountered when acting on electrical signals. Moreover, though optical fibers have been mentioned, it is clear that the components of the device could utilize integrated optics guides. Still further, the signal on wire 1 could be issued after COM has recognized the initial word for a predetermined number of times (for instance 3 or 4) at intervals equal to the cell period.

We claim:

1. A method of time realignment of ATM cells in an optical ATM switching node, said method comprising the steps of:

(a) passing an ATM cell to be realigned along an optical path from one switching element of said node with an original optical carrier;

(b) recognizing a beginning of the ATM cell to be realigned and evaluating a time offset between said beginning and a reference instant;

(c) converting said time offset into an error signal;

(d) commanding with said error signal a transfer of said cell to a rephasing optical carrier; and (e) sending the cell and the rephasing optical carrier over a segment of predetermined length of an optical fiber with a high time dispersion, the rephasing optical carrier being of such wavelength that the cell reaches a subsequent switching element of the node at a predetermined instant.

2. The method defined in claim 1 wherein, for the generation of the rear signal, a signal of a duration proportional to a delay between a recognition instant and the reference instant is obtained from a signal indicative of the recognition of the beginning of the cell, said signal of said duration is integrated to obtain an integrated signal with an amplitude proportional to the delay, and the integrated signal is sampled to obtain a signal of a stable level.

3. The method defined in claim 2 wherein the signal of stable level is equalized to compensate any possible non-linearity of means for performing the wavelength conversion operation.

4. A method of time realignment of ATM cells in an optical ATM switching node, said method comprising the steps of:

(a) passing an ATM cell to be realigned along an optical path from one switching element of said node with an original optical carrier;

(b) recognizing a beginning of the ATM cell to be realigned and evaluating a time offset between said beginning and a reference instant;

(c) converting said time offset into an error signal;

(d) commanding with said error signal a transfer of said cell to a rephasing optical carrier; and (e) sending the cell and the rephasing optical carrier over a segment of predetermined length of an optical fiber with a high time dispersion, the rephasing optical carrier being of such wavelength that the cell reaches a subsequent switching element of the node at a predetermined instant, the recognition of the beginning of the cell comprising the steps of:

effecting a series-to-parallel conversion of optical bits of the cell having a predetermined initial bit configuration, with a degree of parallelism equal to a number of bits in said initial configuration, detecting and converting into logic signals, each group of optical bits resulting from the series-to-parallel conversion comparing each group of logic signals with said initial configuration, and generating a signal of predetermined logic level when a comparison has a positive outcome.

5. The method defined in claim 4 wherein, for the generation of the rear signal, a signal of a duration proportional to a delay between a recognition instant and the reference instant is obtained from a signal indicative of the recognition of the beginning of the cell, said signal of said duration is integrated to obtain an integrated signal with an amplitude proportional to the delay, and the integrated signal is sampled to obtain a signal of a stable level.

6. The method defined in claim 5 wherein the signal of stable level is equalized to compensate any possible non-linearity of means for performing the wavelength conversion operation.

7. A device for time realignment of an ATM cell in an optical ATM cell in an optical ATM switching node where a cell to be realigned is sent into a segment of an optical fiber of a predetermined length with high time dispersion after being associated to a rephasing optical carrier of such a wavelength that affects the transient rate of the cell along the fiber so that the cell reaches an input of a subsequent switching element of the node at a predetermined instant, such device comprising:

means for extracting a fraction of the optical signal associated to the cell to be realigned;

means for recognizing the beginning of a cell, by utilizing the said fraction of the optical signal, and for generating a signal representative of the occurred recognition;

means for receiving and comparing the signal representative of the occurred recognition of the beginning of the cell with a signal representative of a reference instant, and for generating an error signal indicative of the entity of the delay between the two signals;

a tunable wavelength converter, driven by the said error signal, to transfer the cell to be realigned from an original carrier, to which the cell received by the device is associated, to the rephasing carrier for time dispersion in the optical fiber of predetermined length.

8. A device for time realignment of an ATM cell in an optical ATM cell in an optical ATM switching node where a cell to be realigned is sent into a segment of an optical fiber of a predetermined length with high time dispersion after being associated to a rephasing optical carrier of such a wavelength that affects the transient rate of the cell along the fiber so that the cell reaches an input of a subsequent switching element of the node at a predetermined instant, such device comprising:

means for extracting a fraction of the optical signal associated to the cell to be realigned;

means for recognizing the beginning of a cell, by utilizing the said fraction of the optical signal, and for generating a signal representative of the occurred recognition;

means for receiving and comparing the signal representative of the occurred recognition of the beginning of the cell with a signal representative of a reference instant, and for generating an error signal indicative of the entity of the delay between the two signals;

a tunable wavelength converter, driven by the said error signal, to transfer the cell to be realigned from an original carrier, to which the cell received by the device is associated, to the rephasing carrier for time dispersion in the optical fiber of predetermined length, said cell having a predetermined initial bit configuration and said means for recognizing said beginning of said cell comprising:

a series to parallel converter for optical bits of the cell having as many outputs as equal the number of bits in said initial configuration, detection means connected to said converter for converting into logic electrical signals each group of optical bits exiting said series-to-parallel converter, and a comparison logic network for comparing each group of logic signals with said initial configuration and generating a signal at a predetermined positive outcome.

9. The device defined in claim 8 wherein said means for generating said error signal includes:

a bistable device activated by said signal of said predetermined logic level and reset at the end of the cell, a two-input logic gate connected at one input to a time reference signal and at a second input to an output of said bistable device for generating a pulse of a duration proportional to a delay to the output signal of said bistable device with respect to the reference signal, an integrator connected to said two-input logic gate for converting an output signal to the logic gate into a signal of an amplitude proportional to the delay, and a sample and hold circuit connected to said integrator for sampling a signal leaving said integrator and generating a signal at a stable level that substitutes said error signal.

10. The device defined in claim 9, further comprising an equalization circuit connected to said sample and hold circuit and receiving the error signal and supplying same to a tunable wavelength converter after compensation of nonlinearities of the sources in the tunable wavelength converter.

* * * * *